May 23, 1967   R. H. RILEY, JR., ET AL   3,320,824
NOISE-SUPPRESSED GEARS AND THE LIKE
Filed Aug. 19, 1964

INVENTORS
Robert H. Riley, Jr. &
William W. Chambers
BY Arnold & Roylance
ATTORNEYS

United States Patent Office 3,320,824
Patented May 23, 1967

3,320,824
NOISE-SUPPRESSED GEARS AND THE LIKE
Robert H. Riley, Jr., and William W. Chambers, Towson, Md., assignors to The Black and Decker Manufacturing Company, Towson, Md., a corporation of Maryland
Filed Aug. 19, 1964, Ser. No. 390,557
8 Claims. (Cl. 74—443)

This invention relates to gearing and the like and, more particularly, to improved mountings for gears and similar devices.

In constructing drive mechanism employing gears or equivalent drive elements, it is often difficult to provide a structure which can be manufactured within a practical cost range and which will still not be excessively noisy. In simple pinion-and-gear type speed reduction units, for example, excessive noise tends to result from vibrations transmitted between the gears and their supporting shafts, both angularly and axially.

The problem is frequently accentuated when the gear is mounted on a splined shaft or spindle. Tolerance accumulations in such cases tend to result in slight angular misalignments between the splines of the gear and the splines of the shaft so that, when the gear is locked on the shaft by the threaded nut usually employed in the prior art, the misalignment causes a mechanical constraint between the gear and shaft, and undesired vibratory noises result during operation. Before the present invention, no practical, low cost solution to this problem had been provided.

A general object of this invention is to devise an improved mounting for gears and the like capable of markedly suppressing noise during operation of the gear.

Another object is to provide an improved noise-suppressing means for gears and the like mounted on either splined or plain shafts.

A further object is to devise means for reducing noise in gears and the like wherein a lubricant is sealed between the gear or the like and the shaft on which the same is mounted.

Stated generally, the invention employs two resiliently compressible cushioning elements each at least partially encircling the supporting shaft at a different side of the gear or the like, the cushioning elements each being held under axial compression between the gear and a suitable retaining element so that each cushioning element is resiliently deformed into firm engagement with a side face of the gear and with the shaft or other supporting structure. In particularly advantageous embodiments of the invention, the cushioning elements are completely annular and so disposed, relative to the shaft and gear, as to define a space to trap lubricant between the gear and the supporting shaft, so that a film of lubricant is provided to at least minimize metal-to-metal contact.

In order that the manner in which the foregoing and other objects are achieved in accordance with the invention can be understood in detail, particularly advantageous embodiments will be described with reference to the accompanying drawings, which form a part of this specification, and wherein.

Figure 1:
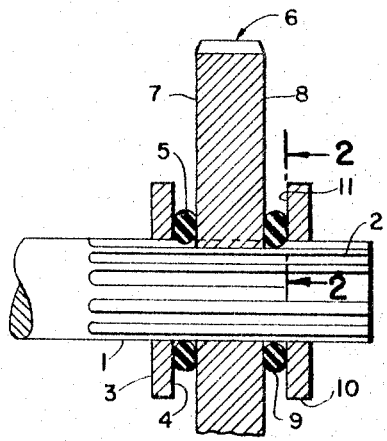
FIG. 1 is a view, partly in side elevation and partly in axial cross-section, of a gear-and-shaft assembly in accordance with one embodiment of the invention.
Figure 2:
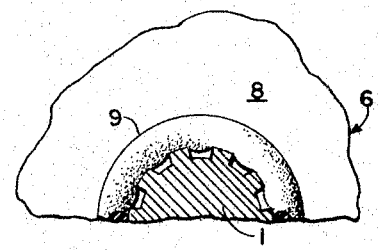
FIG. 2 is an enlarged fragmentary transverse sectional view taken on line 2—2, FIG. 1.

Turning now to the drawings in detail, and first to FIGS. 1 and 2 thereof, it will be seen that the embodiment of the invention here illustrated comprises a straight rigid rotary shaft 1 having an axially splined end portion 2. A first retaining ring 3 is secured to the shaft and presents a flat abutment face 4 lying in a plane transverse to the longitudinal axis of the shaft. An O-ring 5, formed of a resiliently compressible material such as synthetic rubber, encircles the shaft adjacent face 4. A gear 6, having a splined hub adapted to coopertae with the splines presented by the shaft, is carried by the shaft and disposed with its side face 7 engaging the O-ring 5. Adjacent the opposite side face 8 of the gear, a second O-ring 9, identical to ring 5, encircles shaft 1. The assembly is completed by a second retaining ring 10 which is fixed to the shaft and presents a flat, transverse abutment face 11 for engagement with O-ring 9.

The space between retaining rings 3 and 10 is such that the O-rings 5 and 9 are held in compression, O-ring 5 being compressed between abutment face 4 and the side face 7 of gear 6 while O-ring 9 is compressed between side face 8 of the gear and abutment face 11 of retaining ring 10. The O-rings 5 and 9 have a normal internal diameter substantially equal to the diameter of shaft 1 but are compressed axially to such a degree that the inner peripheral portion of each O-ring is forced into the splines on the shaft, as seen in FIG. 2.

In the assembly just described, the O-rings 5 and 9 are effective to absorb at least a portion of the vibratory forces to be transferred between the shaft and the gear, whether these forces are exerted angularly about the axis of the shaft or axially of the shaft. Deformation of the O-rings in such fashion that the inner peripheral portions thereof project into the splines of the shaft distinctly increases the sound deadening capabiltieis of the assembly. In addition to directly absorbing vibratory forces, the O-rings allow the gear to have a resiliently limited degree of freedom of axial movement relative to the shaft so that the gear can "float" axially into a position in which maximum alignment between the splines of the gear and the splines of the shaft is achieved.

Figure 3:
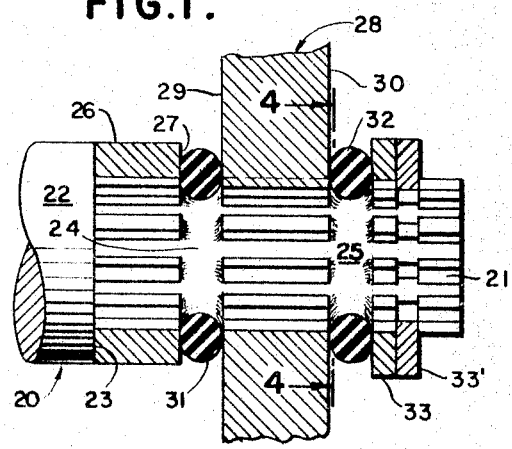
FIG. 3 is a fragmentary axial sectional view of a gear-and-shaft assembly in accordance with another embodiment of the invention.
Figure 4:
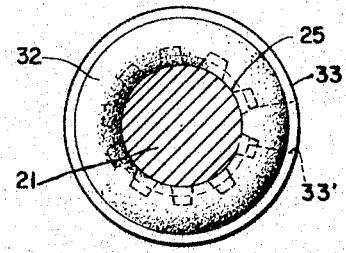
FIG. 4 is a transverse sectional view taken on line 4—4, FIG. 3.

In the embodiment of the invention shown in FIGS. 3 and 4, the straight rigid shaft 20 is provided with a splined end portion 21 and a body portion 22 of larger diameter, so that a transverse annular shoulder 23 is provided, the shoulder 23 being directed toward the splined end of the shaft. The splined portion of the shaft is provided with two transverse annular outwardly opening grooves 24 and 25 which are spaced apart axially relative to the shaft. Grooves 24 and 25 are of arcuate transverse cross-section and of a depth at least substantially equal to the depth of the splines in the shaft. Encircling the shaft adjacent shoulder 23 is a cylindrical spacer 26, the length of the spacer being such that it completely fills the space between shoulder 23 and the adjacent edge of groove 24. At one end, the spacer 26 directly engages shoulder 23. At the other end, the spacer presents a transverse annular flat abutment face 27.

A gear 28, having a splined hub dimension to cooperate with the splined portion of shaft 20, is engaged with the shaft between grooves 24 and 25. Gear 28 has flat side faces 29 and 30 and is of a thickness such that, with the gear centered between grooves 24 and 25 as seen in FIG. 3, side face 29 of the gear is aligned with the adjacent edge of groove 24 while side face 30 of the gear is similarly aligned with the adjacent edge of groove 25.

A resiliently compressible O-ring 31 is engaged in groove 24, the O-ring having a circular transverse cross-section of such diameter that a major portion of the O-ring projects outwardly to lie between abutment face 27 and the side face 29 of the gear. At the opposite side of the gear, groove 25 is occupied by an O-ring 32 which is identical with O-ring 31. The assembly is completed by a plain, flat, circular ring 33 which embraces the splined portion of the shaft adjacent groove 25 and is forced against O-ring 32 by a retaining ring 33' which is fixed against axial movement, as by being engaged in a transverse annular groove in the shaft.

The positions of abutment face 27 and retaining ring 33 are such that the O-rings 31 and 32 are held in axial compression. Thus, O-ring 31 is axially compressed between abutment face 27 and side face 29 of the gear, while O-ring 32 is axially compressed between side face 30 of the gear and the adjacent side face of retaining ring 33. Such axial compression of the O-rings causes the O-rings to be formed in such fashion as to have their inner peripheral portions firmly engaged with the surfaces of the grooves 24 and 25, respectively. Similarly, the O-rings are firmly engaged with the side faces of the gear. Accordingly, the two O-rings serve not only as sound deadening elements, to absorb relative vibratory movement between the shaft and the gear, but also as sealing elements to establish fluid-tight seals at the ends of those portions of the splines in the shaft which lie between the two grooves, so that lubricant can be entrapped within the hub of the gear. The entrapped lubricant exists as a film intervening between the splined shaft and the splined hub to minimize metal-to-metal contact between the shaft and gear. Thus, the entrapped lubricant provides a cushioning action which supplements the resilient cushioning action afforded by the O-rings 31 and 32. Presence of the entrapped liquid also allows the gear to have greater freedom of movement axially of the shaft, within the limits determined by the O-rings, so that automatic correction of angular misalignment between the splines is achieved more effectively.

Figure 6:
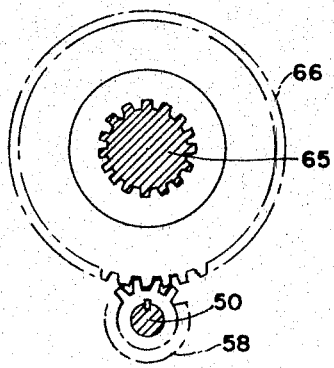
FIG. 6 is a transverse sectional view taken on line 6—6, FIG. 5.
Figure 5:
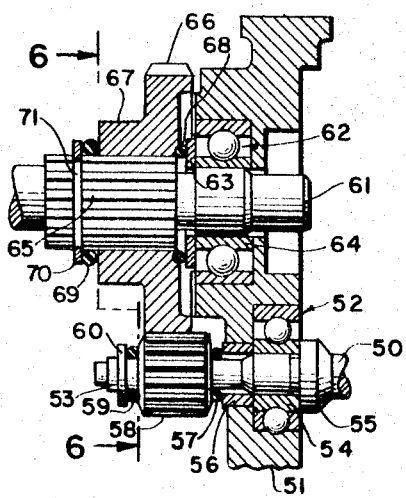
FIG. 5 is an axial sectional view of a speed reduction gearing unit embodying the invention.

FIGS. 5 and 6 illustrate a typical application of the invention to a speed reduction gearing useful, for example in an electric motor driven drill or the like. Here, the straight rigid motor shaft 50 is rotatably supported on a plate 51 by a conventional ball bearing indicated generally at 52. Beyond the bearing, the shaft 50 projects completely through a suitable opening in plate 51 and terminates in a free tip at 53. The inner race 54 of bearing 52 directly engages a shoulder on the shaft, the shoulder being provided by an enlarged portion 55. On the opposite side of the bearing, the shaft 50 is encircled by a cylindrical spacing sleeve 56, one end of the sleeve directly engaging the inner race 54 of the bearing. A resiliently deformable O-ring 57 encircles the shaft adjacent spacer 56.

Pinion 58 is carried by the shaft in such fashion that one side face of the pinion directly engages the O-ring 57. A second resiliently deformable O-ring 59 encircles the shaft on the opposite side of the pinion. A split retaining ring 60, engaged in a suitable groove in the end portion of the shaft, complete the assembly. The location of retaining ring 60 is so chosen that the O-rings 57 and 59 are axially compressed, O-ring 57 being compressed between the adjacent side of pinion 58 and the end of spacing sleeve 56. O-ring 59 is axially compressed between the other side of the pinion and the adjacent face of retaining ring 60.

The pinion 58 can be secured against rotation on shaft 50 in any conventional fashion, as by splines, as hereinbefore described with reference to FIGS. 1–4, or by a key as illustrated in FIG. 6, or in any other conventional fashion.

Plate 51 also carries a second straight rigid shaft 61 which is rotatably supported by a bearing indicated generally at 62. At the side of plate 51 adjacent pinion 58, shaft 61 is encircled by a spacing ring 63 which directly engages the corresponding end of the inner race 64 of bearing 62. Beyond spacing ring 63, shaft 61 has a splined portion 65. The driven gear 66, having a suitably splined hub 67, is engaged with the splined portion of shaft 61, as shown in FIG. 5. At the side of gear 66 adjacent plate 51, the hub of the gear is provided with an annular notch which accommodates a resiliently compressible O-ring 68, the location of the O-ring-accommodating notch being such that the O-ring is aligned with the adjacent face of spacing ring 63. On the opposite side of the gear 66, the splined portion 65 of shaft 61 is encircled by a second resilient compressible O-ring 69. Finally, a split retaining ring 70 is provided, suitably engaged in a groove 71 in the splined portion of the shaft.

The location of groove 71 is such that both O-rings 68 and 69 are held in axial compression. O-ring 68 is compressed between the hub of gear 66 and the adjacent face of ring 63, the inner race 64 of bearing 62 serving as a means for preventing axial movement of the assembly toward plate 51. O-ring 69 is held in compression between retaining rings 70 and the adjacent end face of hub 67 of gear 66.

When both the pinion 58 and the gear 66 are attached to their respective shafts by splined connections, either the embodiment of FIGS. 1 and 2, or the embodiment of the invention shown in FIGS. 3 and 4 can be employed, depending on whether or not it is desired to have lubricant trapped between the hub of the gear and the shaft. In all events, the axially compressed O-rings 57, 59, 68 and 69 serve to markedly suppress the noise level which would ordinarily be encountered with a gear drive mechanism of this type.

When the invention is practiced in the manner described with reference to FIGS. 1 and 2, the resiliently compressible elements 5 and 9 need not completely encircle the shaft and therefore, need not be completely annular. Thus, in FIGS. 1 and 2, the elements 5 and 9 can be partially annular, or C-shaped, or can even be replaced by several individual resilient elements spaced around the shaft, so long as the desired resilient cushioning is provided under axial compression between the side faces of the gear and the adjacent abutment faces 4 and 11. When lubricant entrapment is to be achieved, however, as in the embodiment of FIGS. 3 and 4, the resiliently compressible elements are made completely annular, so as to provide sealing engagement with the shaft as well as with the gear.

Though, for purposes of simplicity of illustration and description, the invention has been disclosed as applied to gear mechanisms, it will be understood by those skilled in the art that it has similar application to other rotary devices, such as fly wheels and the like, where relatively high noise levels have heretofore been encountered during operation of the mechanism. Though particularly advantageous embodiments of the invention have been chosen for illustrative purposes, it will be understood that various changes and modifications can be made therein, without departing from the scope of the invention as defined in the appended claims.

What is claimed is:

1. In a sound and vibration suppressing rotary mechanism, the combination of
    a straight rigid rotary shaft;
    a rotary member mounted on said shaft for rotation therewith and for axial movement,
        said rotary member having opposite side surfaces extending transversely of said shaft adjacent thereto;
    means rotatable with said shaft and presenting two opposing spaced abutment faces disposed each on a different side of said rotary member; and
    two resiliently compressible means disposed each on a different side of said rotary member and each held in axial compression between one of said abutment faces and one of said side surfaces;

said resiliently compressible means permitting resiliently limited axial movement of said rotary member whereby sound and vibration are suppressed.

2. A rotary mechanism in accordance with claim 1 and wherein
each of said resiliently compressible means is an at least partially annular element and such axial compression causes said elements to be deformed inwardly into engagement with said shaft.

3. A rotary mechanism in accordance with claim 2 and wherein
said rotary member is a gear,
said shaft is provided with splines in the area occupied by said gear and said annular elements, and
such compression of said annular elements causes the inner peripheral portions thereof to protrude into the splines on said shaft to increase the sound and vibration suppression of the rotary mechanism.

4. A rotary mechanism in accordance with claim 2 and wherein
said shaft comprises
a splined portion extending axially throughout at least the space between said abutment faces, and
a pair of transverse annular outwardly opening grooves disposed each on a different side of said rotary member, the depth of said grooves being at least substantially equal to the depth of the splines in said splined portion of said shaft,
each of said resiliently compressible elements being fully annular and disposed with its inner peripheral portion in compressive engagement in a different one of said grooves.

5. A rotary mechanism in accordance with claim 4 and wherein
said rotary member is a gear having a splined hub engaged with said splined portion of said shaft,
said grooves are arcuate in transverse cross-section, and
said annular elements are O-rings of circular transverse cross-section.

6. In a sound and vibrating suppressing rotary mechanism, the combination of
a straight rigid rotary shaft;
abutment means carried by said shaft and fixed against axial movement relative to said shaft in one direction, said abutment means presenting an abutment face directed axially of said shaft in the opposite direction;
an annular spacer encircling said shaft adjacent said abutment face;
a rotary member mounted on said shaft for rotation therewith and for axial movement and spaced from said spacer on the side thereof opposite said abutment means;
first resiliently compressible means disposed between said spacer and said rotary member;
second resiliently compressible means disposed on the side of said rotary member opposite said first annular element; and
a retaining member fixed to said shaft on the side of said second resiliently compressible means opposite said rotary member,
the axial position of said retaining member on said shaft being such that said first resiliently compressible means is held in axial compression between said spacer and said rotary member and said second resiliently compressible means is held in axial compression between said rotary member and said retaining member,
such compression causing said resiliently compressible means to be deformed into engagement with said shaft.

7. A rotary mechanism in accordance with claim 6 and wherein
said abutment means is the inner race of an anti-friction roller bearing.

8. In a sound and vibration suppressing rotary motion transfer device, the combination
a starting rigid rotary shaft having
a splined portion, and
two transverse annular outwardly opening grooves located at said splined portion and spaced apart axially of said shaft, the depth of said grooves being at least equal to the depth of the splines in said shaft;
a gear having a splined hub engaged with the splined portion of said shaft,
each of said grooves being located on a different side of said gear;
two resiliently compressible rings each encircling said shaft on a different side of said gear; and
means rotatable with said shaft and presenting two opposing, axially spaced abutment faces disposed each on a different side of said gear,
said rings each being held in axial compression between said gear and a different one of said abutment faces, such compression maintaining said rings in sealing engagement with the surfaces of said grooves and with said gear, whereby said rings coact with said gear and shaft to define a sealed space for entrapment of lubricant in the area of engagement of the splined portion of said shaft with the splined hub of said gear.

References Cited by the Examiner

UNITED STATES PATENTS

| | | | |
|---|---|---|---|
| 2,281,157 | 4/1942 | Kanuch et al. | 103—126 |
| 2,510,414 | 6/1950 | Philbrick | 277—63 |
| 2,861,435 | 11/1958 | Seanor | 277—63 |
| 2,862,655 | 12/1958 | Dickson | 230—207 X |
| 2,867,130 | 1/1959 | Moeller | 74—443 |
| 2,967,487 | 1/1961 | Nagely | 103—126 |
| 3,059,584 | 10/1962 | Cottell | 103—126 |
| 3,191,545 | 6/1965 | Funk | 103—126 X |

FRED C. MATTERN, Jr., *Primary Examiner.*

DAVID J. WILLIAMOWSKY, *Examiner.*

C. J. HUSAR, *Assistant Examiner.*